(12) United States Patent
Tiotantra et al.

(10) Patent No.: US 12,334,108 B1
(45) Date of Patent: Jun. 17, 2025

(54) SPECULATIVE READ REGULATION IN HARD DISK DRIVES HAVING READ RELIABILITY BUDGETS

(71) Applicant: Seagate Technology LLC, Fremont, CA (US)

(72) Inventors: Harry Tiotantra, Shugart (SG); Li Xin, Shugart (SG); Xu Huang, Shugart (SG); Jeetandra Kella, Shugart (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/648,811

(22) Filed: Apr. 29, 2024

(51) Int. Cl.
*G11B 20/10* (2006.01)

(52) U.S. Cl.
CPC .................. *G11B 20/10481* (2013.01)

(58) Field of Classification Search
None
See application file for complete search history.

(56) References Cited

U.S. PATENT DOCUMENTS

| | | | | |
|---|---|---|---|---|
| 6,249,896 B1* | 6/2001 | Ho | ................ | G11B 20/1813 714/814 |
| 6,310,743 B1* | 10/2001 | Haines | .................. | G11B 21/10 360/78.07 |
| 7,334,144 B1* | 2/2008 | Schlumberger | ....... | G06F 1/3221 713/340 |
| 7,444,541 B2 | 10/2008 | Lubbers | | |
| 7,996,623 B2 | 8/2011 | Walker | | |
| 8,327,076 B2 | 12/2012 | Murphy | | |
| 8,363,519 B2 | 1/2013 | Lubbers | | |
| 8,874,848 B2 | 10/2014 | Soundararajan | | |
| 9,076,530 B2 | 7/2015 | Gomez | | |
| 9,529,724 B2 | 12/2016 | Venkata | | |
| 2002/0035704 A1* | 3/2002 | Wilson | .................. | G11B 5/5565 |
| 2002/0059276 A1* | 5/2002 | Wei Loon | ............ | H04N 21/232 |
| 2003/0093640 A1* | 5/2003 | Mowery | ................ | G11B 20/10 711/112 |
| 2003/0145164 A1* | 7/2003 | Hoskins | ............... | G11B 5/5552 |
| 2003/0225993 A1* | 12/2003 | Yagisawa | ............... | G06F 3/0605 711/202 |
| 2004/0217888 A1* | 11/2004 | Noda | .................. | G11B 20/1426 |
| 2004/0258392 A1* | 12/2004 | Morita | .................... | G11B 27/34 386/265 |
| 2006/0007828 A1* | 1/2006 | Kadowaki | ............ | G01R 31/312 369/53.18 |
| 2008/0271077 A1* | 10/2008 | Kim | ....................... | G11B 27/34 725/39 |
| 2008/0316071 A1* | 12/2008 | Coene | ................ | G11B 20/1426 341/59 |
| 2020/0192602 A1* | 6/2020 | Benisty | .................... | G06F 3/061 |

* cited by examiner

*Primary Examiner* — Peter Vincent Agustin
(74) *Attorney, Agent, or Firm* — Mueting Raasch Group

(57) ABSTRACT

Described are systems, devices and methods for regulating speculative reading in a hard disk drive that has a read reliability budget. Regulating speculative reading under a read reliability budget involves selecting an amount of read look ahead (RLA) in response to determining whether or not a read rate exceeds the read reliability budget. When the read rate is lower than the read reliability budget, a full RLA amount can be used, thus ensuring high performance. When the read rate exceeds the read reliability budget, the RLA amount can be adjusted down while maintaining performance at acceptable levels. Adjustments to RLA may be made at periodic intervals, and in response to whether the workload is more sequential or more random.

18 Claims, 4 Drawing Sheets

SPECULATIVE READ REGULATION IN HARD DISK DRIVES HAVING READ RELIABILITY BUDGETS

The disclosure relates to controlling speculative reads in hard disk drives.

SUMMARY

In accordance with certain aspects, the present disclosure describes systems, devices and methods for regulating read look ahead (RLA) in a hard disk drive having a read reliability budget, including selecting an RLA amount responsive to determining whether or not a read rate exceeds the read reliability budget. In certain aspects, selecting the RLA amount is also responsive to determining whether or not a current read workload is predominantly sequential.

In certain aspects, the step of selecting the RLA amount includes using a full RLA amount responsive to determining that the read rate does not exceed the read reliability budget, and responsive to determining that the read rate exceeds the read reliability budget using a high RLA amount that does not exceed the full RLA amount when the current read workload is predominantly sequential and using a low RLA amount that is less than the high RLA amount when the current read workload is not predominantly sequential. In certain aspects, the low RLA amount does not exceed a historical sequential burst size metric.

In accordance with certain aspects, the present disclosure describes methods for regulating RLA performance in a hard disk drive. In such methods, RLA operations are performed at a full RLA amount for an initial time interval. After the initial time interval and for each of a plurality of subsequent time intervals, a historical read rate is compared with an upper rate limit and a lower rate limit, and the RLA amount for performing RLA operations is adjusted during a current time interval in accordance with the following rules: (a) when the historical read rate is above the upper rate limit, the RLA amount is adjusted based on a historical sequential burst size; (b) when the historical read rate is below the lower rate limit, the full RLA amount is used; and (c) when the historical read rate is between the upper rate limit and the lower rate limit, the RLA amount is set according to which of rule (a) or (b) was used during a time interval immediately preceding the current time interval.

In certain aspects, the initial time interval is 6 months and the subsequent time intervals are each 1 month.

In certain aspects, the maximum RLA amount is 5 milliseconds.

In certain aspects, adjusting the RLA amount is additionally based on a read workload metric. For example, the RLA amount is the full RLA amount and the rules (a), (b), and (c) are bypassed for workloads that are predominantly sequential.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
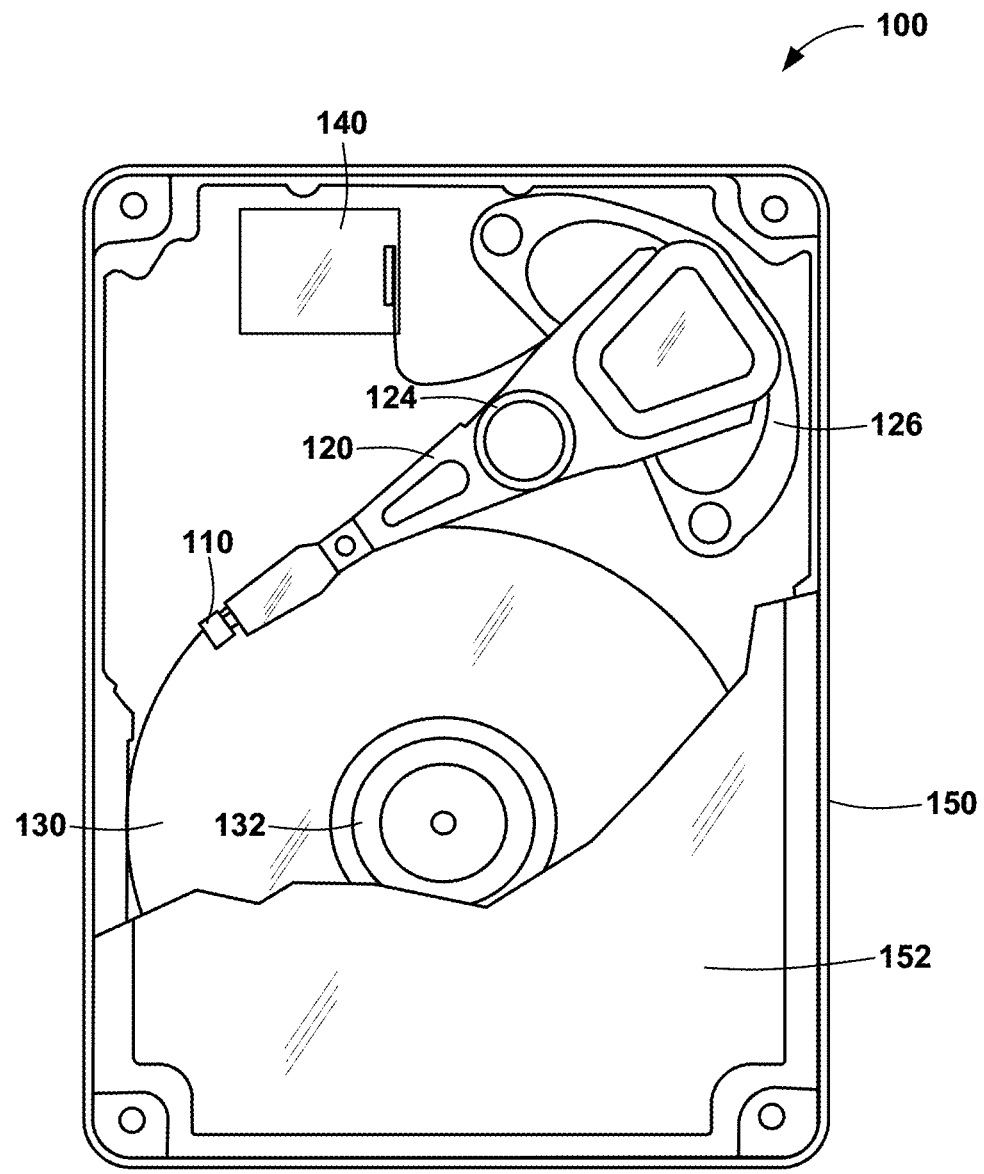
FIG. 1 is schematic representation of a hard disk drive for use in accordance with aspects of the present disclosure.

The present disclosure relates to controlling speculative reads in hard disk drives (HDDs) that have a read reliability budget. The read reliability budget is an amount of disk reads (for example expressed in total Tebibytes) allowed over a given period of time. The read reliability budget does not limit host read commands. In accordance with various aspects of the present disclosure, regulating speculative reads allows performance gains to be realized without undue read amplification and thus staying within the read reliability budget to extend the lifetime of the HDD. Speculative reading, or disk reads beyond host requests, is often performed during idle times when there is no outstanding command from the host to be acted upon. As such, speculative reading provides potential performance upside with little or no performance cost if the data retrieved by the speculative reading is eventually requested by the host. However, if the speculatively retrieved data is not eventually requested by the host, then the amount of reading was increased beyond what was needed. This is called read amplification.

In some HDDs it may be desirable to maintain the number of reads under a specified rate, and thus to regulate against excessive data reads and read amplification without undesirably throttling performance gains. To address this, the present disclosure provides for regulating speculative reading by comparing an accumulated read rate to a read reliability budget and adjusting an amount of speculative reading in response. This may involve selecting or adjusting the size of the speculative reads responsive to determining whether or not a read rate exceeds a read reliability budget, and may further involve selecting or adjusting the size of the speculative reads based on whether and to what extent the workload is sequential. In certain aspects, adjusting the speculative read size may be based on a historic sequential burst size metric. In other words, the size of speculative reads may be adjusted based on the expected sequential burst size. As with other metadata and non-user data, the HDD historical disk read rate, historical sequential burst size, and other operating information need by the HDD can be stored by the HDD logging function.

Speculative reading is known to increase performance of an HDD by anticipating what data is likely to be requested and reading it from the HDD magnetic media so it can be cached for fast retrieval in case the anticipation proves correct by a forthcoming host command. In the present disclosure, speculative reading is also referred to as read look ahead (RLA), which, without loss of generality also includes read look behind as well as pre-fetching and various caching techniques that go along with speculative reading. Speculative reading is particularly effective in boosting performance under predominantly sequential workloads since the data that is stored near where requested sequential data is stored (whether logically or physically) can often be expected to be requested in subsequent host commands. Having retrieved such data speculatively, it is stored in cache where it can be provided to the host more quickly if requested. The predictability of speculative reading is less reliable and less effective under non-sequential or random workloads. As such, predominantly sequential workloads are more amenable to predictive algorithms than non-sequential or random workloads. The various aspects of the present disclosure may be used in conjunction with predictive algorithms for speculative reading. Predictive algorithms attempt to determine "hot data," which is another term for data that is expected to be requested by the host.

Speculative reading size, which is referred to as RLA amount throughout the present disclosure, may be determined based on logical block address (LBA) ranges, number of data blocks, amount of elapsed time, or any other suitable metric. Because speculative reading is typically performed during idle times, it is convenient to use time (for example, number of milliseconds) as the RLA amount. Because HDD media disks spin at a known rpm (for example, 7200 rpm), converting between speculative read time and speculatively retrieved data size is a simple matter, as will be appreciated.

In accordance with certain aspects of the present disclosure, a full RLA amount can be defined. For example, the full RLA amount may seek to maximize the speculative reading performance gains without any particular regard for read amplification. At periodic intervals, which may be regular or intermittent, it is determined whether the rate of reading data from the disk is exceeding the read reliability budget, and if so then the RLA amount can be adjusted. In one example, adjustments to the RLA amount may including setting the RLA amount to one of a number of predetermined RLA rates, each being lower than the full RLA amount. In another example, adjustments to the RLA amount may including setting the RLA amount within a range. The selection of the adjusted RLA amount may be predetermined or may take into account other variable such as historic sequential burst size and the degree to which the current workload is sequential, random, or somewhere in between.

In certain circumstances, speculative reading may be truncated, for example if an idle time is interrupted by the receipt of a new read/write request. As such, a minimum RLA amount may be defined as an amount that is not interruptible. An HDD controller may be able to adjust seek delays in order to obtain speculative data without incurring significant penalties. For example, if the drive is currently reading speculative data and a new request is received, the device can calculate a delay time that allows the head to seek to the new position just in time to access the new track. This seek delay may allow for reading additional RLA data without introducing additional latency in accessing the new track. A maximum speculative read latency for the system may also be defined as a maximum RLA amount that can be speculatively read without substantially impacting average seek delay times.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts an HDD device 100 that includes a read/write head 110 disposed on the end of an actuator arm 120 that is rotationally movable around a pivot 124 by use of a voice coil motor 126. The read/write head 110 is positioned in close proximity to the surface of magnetic media disk 130 such that the read/write head can write data to and read data from the magnetic media 130 as it spins by action of a spindle motor 132. A controller 140 can be used to control the operation of the internal components of the HDD 100, to send, receive, and condition data signals to and from the recording head, typically through a preamp (not shown), and to communicate with a host device through an interface (not separately indicated). Controller 140 can be used to regulate speculative reading in accordance with the present disclosure, including the monitoring and storing of read logs, workload metrics, historic sequential burst size, read reliability budgets, and so forth, that may be used in the regulation of speculative reading. The internal components of HDD are enclosed in an enclosure 150 that includes a top cover 152, and which may be sealed to maintain an internal environment such as an inert gas atmosphere and controlled humidity. For example, heat-assisted magnetic recording (HAMR) HDDs are typically sealed and filled primarily with helium and optionally residual amounts of other gasses such as oxygen or nitrogen. HAMR HDDs may be specified with a read reliability budget.

Figure 2:
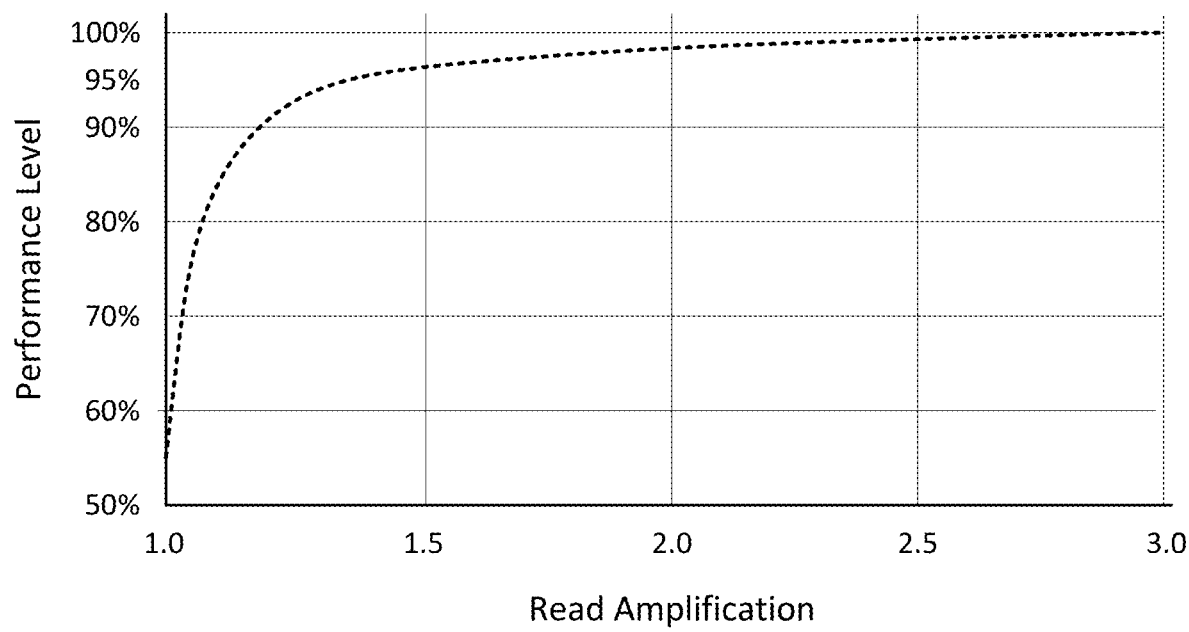
FIG. 2 is a graph depicting performance level versus read amplification when regulating speculative reads for sequential workloads.

FIG. 2 shows a graph representing the relationship between drive performance level and read amplification for speculative reading in a predominantly sequential workload environment. Performance gains are already over 95% of the maximum at a read amplification of 1.5, and performance gains saturate at read amplifications around 3.0. As such, to achieve full performance, the full RLA amount need not be set beyond what would produce read amplifications above 3.0 since further performance gains are not expected. Moreover, when read rates are exceeding the read reliability budget, the RLA can be adjusted to achieve read amplifications at or below 1.5 and still realize performance gains well above 90%.

Methods of regulating speculative reading in accordance with the present disclosure include controlling the amount of speculative reading according to a read budget specification, for example not to exceed 375 TiB per year, and may also include periodic monitoring of the disk read rate (for example monthly) and adjusting how speculative reading is regulated accordingly, as well as limiting speculative reading when random workloads are detected. Such speculative reading regulation methods may include operating under a full RLA amount with no further regulation during an initial period of time (for example six months), thereby realizing full performance benefits while accumulating read rate and workload metrics that can be used for speculative read regulation after the initial period. Methods of the present disclosure may further recognize that predominantly sequential workloads do not exhaust the read reliability budget as quickly, and so the speculative read regulation can take this into account. Methods of the present disclosure can also be employed in a way that attempts to avoid large swings in performance gain due to speculative reads, for example by adjusting to moderately lower or variable RLA amounts without eliminating speculative reading altogether. This helps mitigate against performance level changes that might not meet customer requirements.

Figure 3:
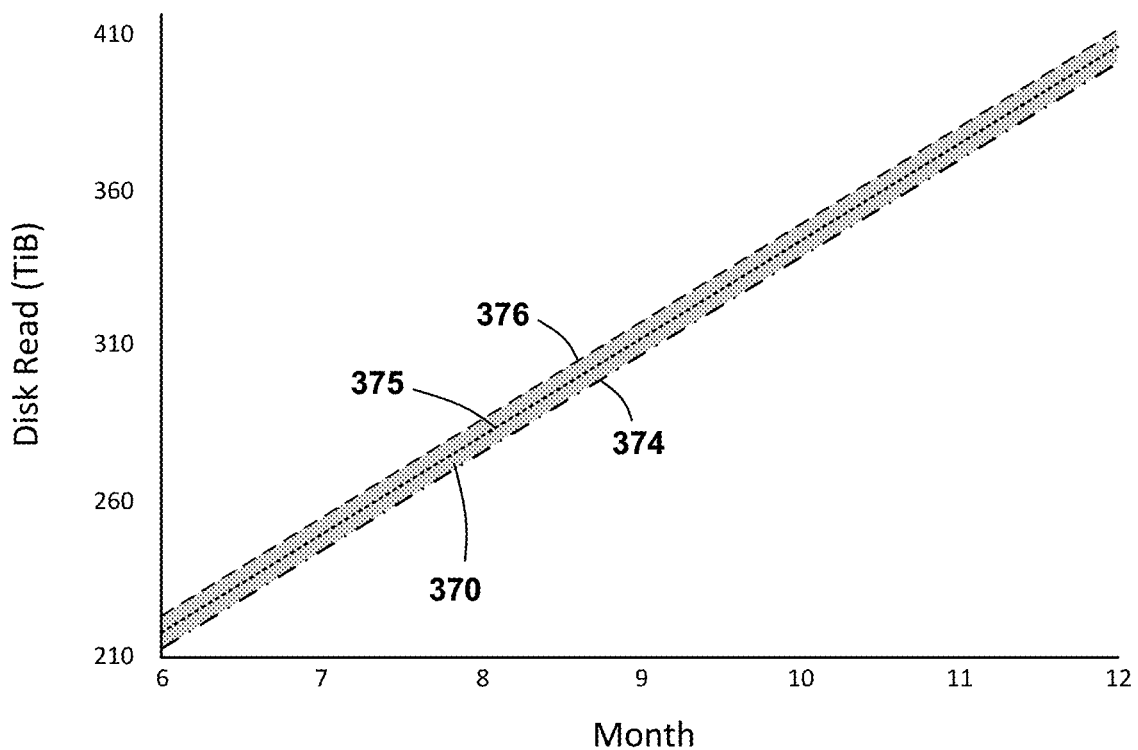
FIG. 3 is a graph indicating a control band for use in regulating speculative reads in accordance with aspects of the present disclosure.

FIG. 3 is a graph indicating a disk read control band 370, shown as a shaded region between an upper limit 376 and a lower limit 374. In certain embodiments of speculative read regulation methods in accordance with the present disclosure, the disk read control band 370 can be used to determine adjustments to the RLA amount. For example, in FIG. 3, the specified read reliability budget is indicated by line 375, which in this case is 375 TiB per year. The disk read control band 370 can be set by determining an upper limit 376 and a lower limit 374, which in this case are 380 TiB per year for an upper limit and 370 TiB per year for a lower limit. It should be noted that a Tebibyte (TiB) is a unit of storage capacity used by a host, and relates to the more commonly recognized Terabyte (TB) by the formula 1 TB=0.909495 TiB.

In the example shown in FIG. 3, there is an initial period of six months in which the speculative read control decision sets the RLA amount at a base RLA amount that has minimal impact on read performance gains. For example, the base RLA amount may be set at 5 milliseconds to accommodate typical host idle times. The base RLA amount may be the full RLA amount (that is, an amount that has no throttling effect on performance) or may be less than a full RLA amount. After the initial six months, the historic read rate is determined on a monthly basis. If the historic read rate is at or less than the lower limit, then the speculative read control decision increases the RLA amount. The increase can be done incrementally, and preferably does not exceed the full RLA amount. If the historic read rate exceeds the upper limit, then the speculative read control decision adjusts the RLA amount lower. The lower adjustments may be according to predetermined decrements, or may be variable and based on a metric such as the historical sequential burst size. In certain embodiments, the lower adjustments maintain the RLA amount in a range of about 1 millisecond to about 5 milliseconds. If the historic read rate is between the upper limit and lower limit, and thus within the control band 370, then the previously-implemented speculative read control decision is maintained.

Figure 4:
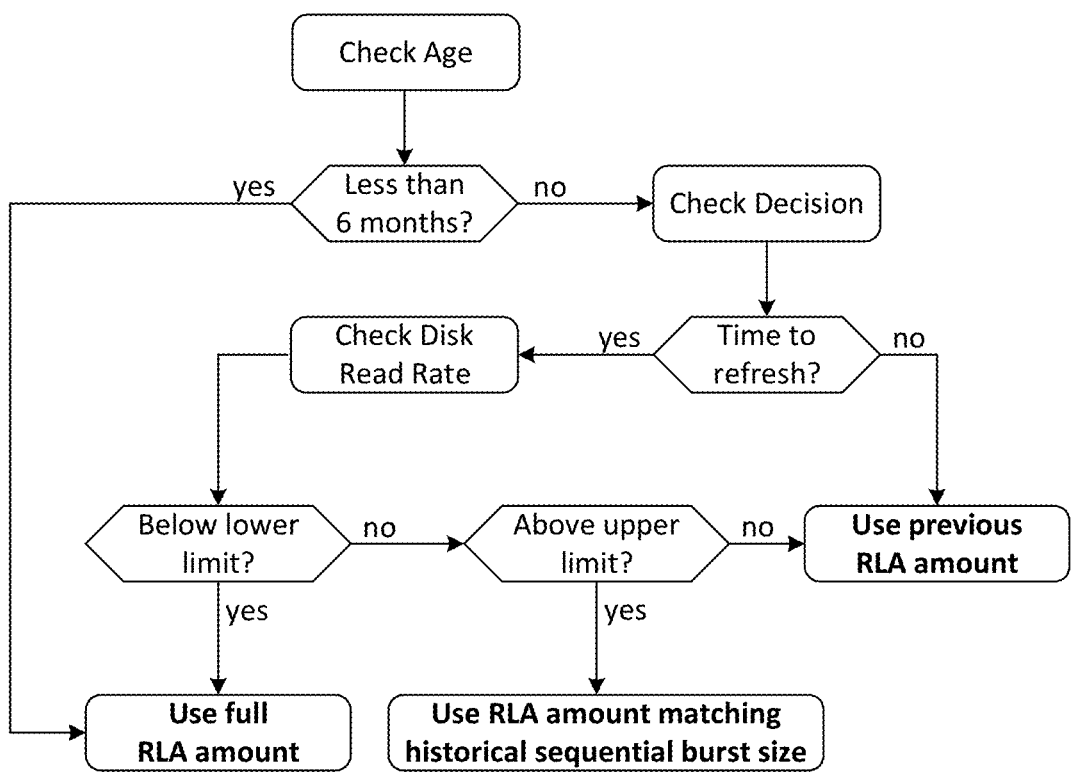
FIG. 4 is a flow chart indicating steps performed in accordance with aspects of the present disclosure.

FIG. 4 shows a decision tree for determining the RLA amount to use in accordance with certain aspects of the present disclosure. First, it may not be necessary to regulate speculative reading at the beginning of and HDD's operational lifetime. Because workloads and performance requirements may vary, it may be useful to allow an HDD to function using the full RLA amount for a period of time, thereby accumulating historical read rates, workload metrics, and sequential burst size information. In the example shown in FIG. 4, for the first six months of the HDD's life, the full RLA amount is used. After the first six months, the decision on RLA amount to use is checked periodically, for example each month. When it is time to refresh the RLA decision, the disk read rate is checked against the upper and lower limits of the read reliability budget control band. If the read rate is below the lower limit, the full RLA amount is used. If the read rate is above the upper limit, the RLA amount is adjusted to match the historical sequential burst size. This helps to ensure that read amplification is limited to the expected size of sequential workload needs, and therefore that any speculative reading will be contributing to performance gains and not to excessive or unproductive reads. When the read rate is within the control band between the lower and upper limits, the previous decision on RLA amount is maintained. Moreover, the previous decision on RLA amount is maintained for the duration of the current time interval. When the current time interval has elapsed, the disk read rate is again checked so that the decision on RLA amount may be updated.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for regulating read look ahead (RLA) performance in a hard disk drive, comprising the steps of:
   for an initial time interval, setting an RLA amount for performing RLA operations at a full RLA amount;
   after the initial time interval and for each of a plurality of subsequent time intervals, comparing a historical read rate with an upper rate limit and a lower rate limit and adjusting the RLA amount for performing RLA operations during a current time interval of the plurality of subsequent time intervals in accordance with the following rules:
   (a) when the historical read rate is above the upper rate limit, adjusting the RLA amount based on a historical sequential burst size,
   (b) when the historical read rate is below the lower rate limit, using the full RLA amount as the RLA amount, and
   (c) when the historical read rate is between the upper rate limit and the lower rate limit, setting the RLA amount according to which of rule (a) or (b) was used during a time interval immediately preceding the current time interval.

2. The method of claim 1, further comprising restarting the steps after a predetermined amount of elapsed time that encompasses the initial time interval and multiple subsequent time intervals.

3. The method of claim 1, wherein the initial time interval is 6 months and the subsequent time intervals are each 1 month.

4. The method of claim 1, wherein the maximum RLA amount is 5 milliseconds.

5. The method of claim 4, wherein in rule (a) adjusting the RLA amount based on a historical sequential burst size comprises adjusting the RLA amount in a range of 1 millisecond to 5 milliseconds.

6. The method of claim 1, wherein adjusting the RLA amount is additionally based on a read workload metric.

7. The method of claim 6, wherein the RLA amount is the full RLA amount and the rules (a), (b), and (c) are bypassed for workloads that are predominantly sequential.

8. The method of claim 1, wherein plurality of subsequent time intervals are regularly spaced.

9. The method of claim 1, wherein the read reliability budget is set at 380 TiB per year or less.

10. The method of claim 1, wherein the historical read rate includes read data accumulated during all time intervals preceding the current time interval.

11. A method for regulating read look ahead (RLA) in a hard disk drive having a read reliability budget, the method comprising selecting an RLA amount responsive to determining whether or not a read rate exceeds the read reliability budget and to determining whether or not a current workload is predominantly sequential,
    wherein selecting the RLA amount comprises:
    using a full RLA amount responsive to determining that the read rate does not exceed the read reliability budget; and
    responsive to determining that the read rate exceeds the read reliability budget, using a high RLA amount that does not exceed the full RLA amount when the current read workload is predominantly sequential and using a low RLA amount that is less than the high RLA amount when the current read workload is not predominantly sequential.

12. The method of claim 11, wherein the step of determining whether or not a read rate exceeds the read reliability budget is performed at periodic time intervals.

13. The method of claim 12, wherein the periodic time intervals occur regularly.

14. The method of claim 12, wherein the periodic time intervals occur intermittently.

15. The method of claim 12, wherein the periodic time intervals start occurring after an initial amount of time.

16. The method of claim 11, wherein the high RLA amount is the full RLA amount.

17. The method of claim 11, wherein the low RLA amount does not exceed a historical sequential burst size metric.

18. The method of claim 11, wherein the read reliability budget is set at 380 TiB per year or less.

* * * * *